(12) United States Patent
Firing

(10) Patent No.: US 9,394,033 B2
(45) Date of Patent: Jul. 19, 2016

(54) FLEXIBLE ROPE TERMINATION DEVICE

(71) Applicant: PGS GEOPHYSICAL AS, Oslo (NO)

(72) Inventor: Thomas Wennerød Firing, Oslo (NO)

(73) Assignee: PGS Geophysical AS, Oslo (NO)

( * ) Notice: Subject to any disclaimer, the term of this patent is extended or adjusted under 35 U.S.C. 154(b) by 0 days.

(21) Appl. No.: 14/511,968

(22) Filed: Oct. 10, 2014

(65) Prior Publication Data

US 2015/0298770 A1  Oct. 22, 2015

Related U.S. Application Data

(60) Provisional application No. 61/981,160, filed on Apr. 17, 2014.

(51) Int. Cl.
*B63B 21/04* (2006.01)
*F16G 11/00* (2006.01)
*B63B 21/56* (2006.01)

(52) U.S. Cl.
CPC .............. *B63B 21/04* (2013.01); *B63B 21/56* (2013.01); *F16G 11/00* (2013.01)

(58) Field of Classification Search
USPC .............................................. 24/129 D, 129 R
IPC .............................................. B63B 21/04, 21/56
See application file for complete search history.

(56) References Cited

U.S. PATENT DOCUMENTS

| 2,600,417 | A | * | 6/1952 | Morris | B63B 21/20 403/210 |
| 2,632,219 | A | * | 3/1953 | Massey | A61F 13/64 24/115 H |
| 3,533,184 | A | * | 10/1970 | Kerr | A01K 91/18 24/114.5 |
| 4,793,274 | A | * | 12/1988 | Regone | G10K 11/006 114/242 |
| 7,669,294 | B2 | | 3/2010 | Campbell | |
| 8,517,439 | B2 | | 8/2013 | Haun et al. | |

FOREIGN PATENT DOCUMENTS

WO  2011018195 A1  2/2011

\* cited by examiner

*Primary Examiner* — Stephen Avila
(74) *Attorney, Agent, or Firm* — Patterson & Sheridan, LLP

(57) ABSTRACT

Embodiments described herein provide rope termination devices with flexible members for accommodating fleet angle in the rope without undue frictional wear on the rope. A metal connector is fastened to a tail with a flexure in a direction perpendicular to a plane through an axial centerline of the rope termination device. The rope wraps around the tail and the metal connector, lying in a passage formed around an exterior of the components, and may be secured by an overbraid jacket applied around the tail portion of the rope termination device.

24 Claims, 13 Drawing Sheets

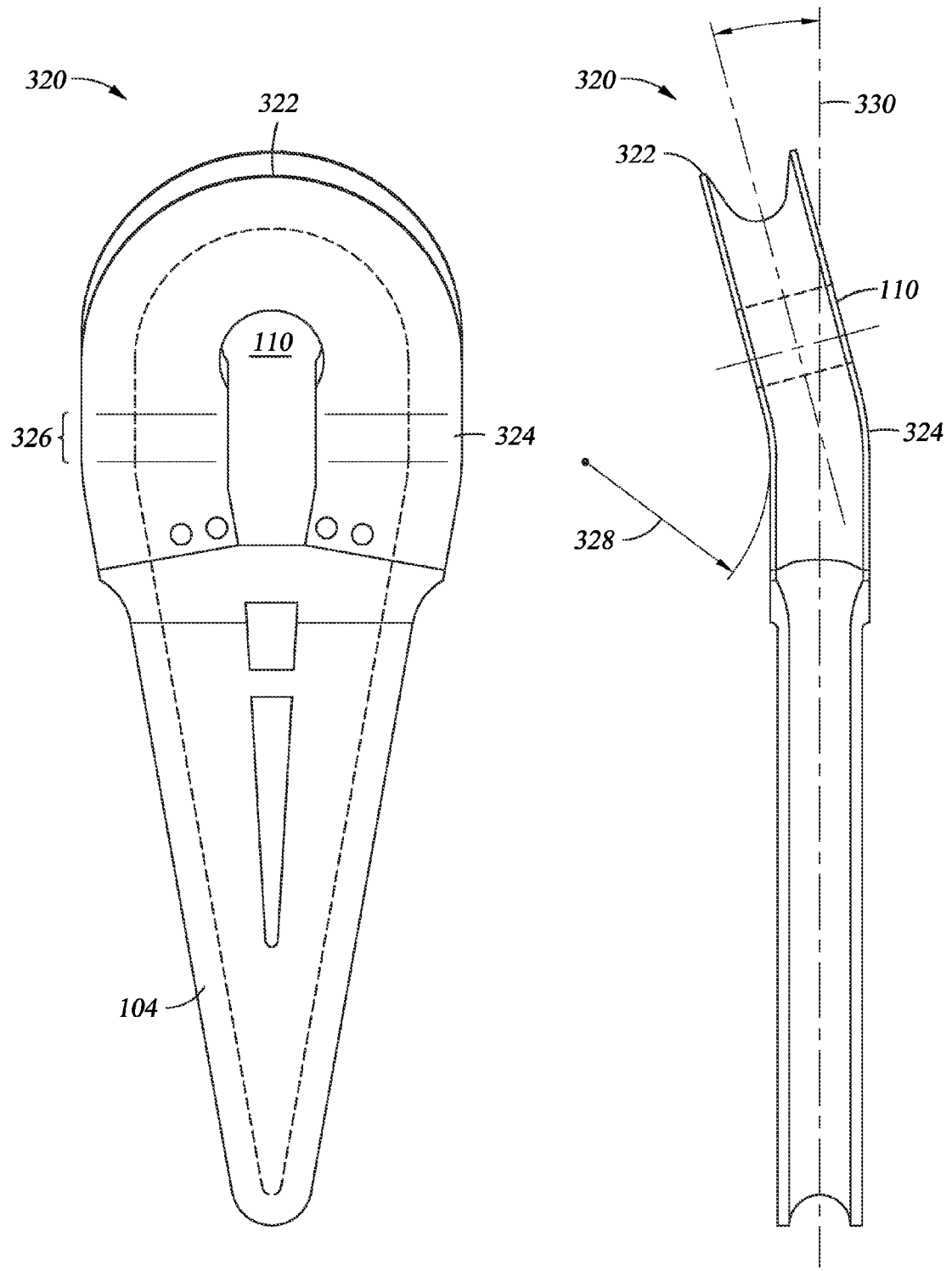
*Fig. 3B*  *Fig. 3C*

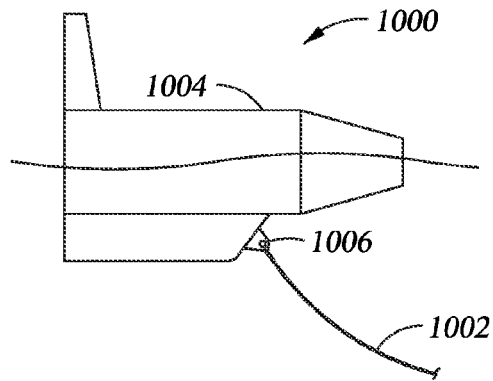
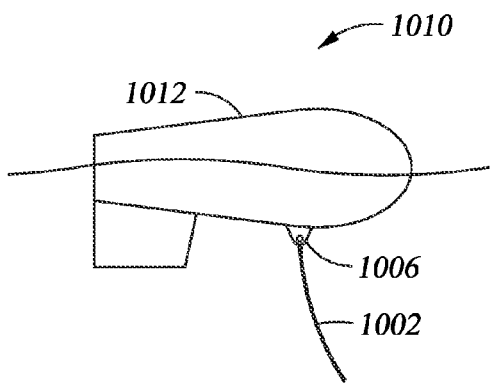
*Fig. 10A*  *Fig. 10B*
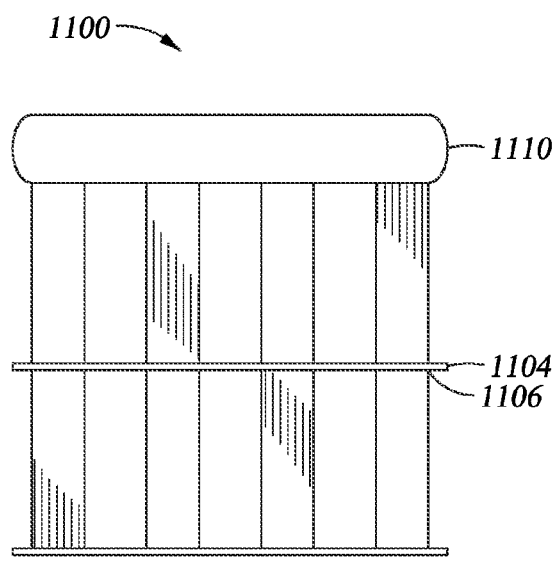
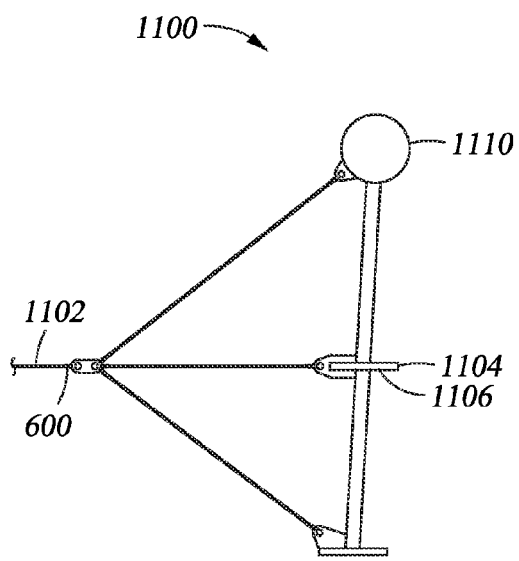
*Fig. 11A*  *Fig. 11B*

FLEXIBLE ROPE TERMINATION DEVICE

CROSS-REFERENCE TO RELATED APPLICATIONS

This application claims benefit of U.S. Provisional Patent Application Ser. No. 61/981,160, filed Apr. 17, 2014, entitled "Rope Sheave With Bend Strain Relief", which is incorporated herein by reference.

BACKGROUND

This disclosure is related generally to the field of rope terminations. The disclosure may have applications in the field of mechanical sheaves. The disclosure may have benefit when applied to marine surveying operations.

In geophysical prospecting in a marine environment, cable configurations are often towed behind a vessel to deploy equipment such as energy sources and sensor cables. Such cables frequently use ropes connected to structures on the vessel that provide load bearing and freedom of movement for the cables. Traditional connections include sheave-to-bolted connections and thimble to shackle connections. The connector, sheave or thimble, may be constrained to move substantially in a plane perpendicular to an axial centerline of the connector in some cases. When a rope termination is constrained by such connector to one degree of freedom or less, a rope tension direction that does not lie in the plane perpendicular to the centerline of the connector may introduce a fleet angle, defined as the angle between the centerline of the connector, for example a sheave, and the rope axis at the edge of the connector. A fleet angle may be created by any number of circumstances, including, for example, misalignment of two sheaves, misalignment of a sheave and a bad, vibration or strumming of the rope, or by winding the rope around a drum. The fleet angle may result in increased stress and friction wear on the rope at the edge of the connector.

Excess wear on ropes results in the need to replace and repair ropes, causing idle time in the geophysical prospecting industry to repair connections for energy sources and sensor cables, for example. There is a need in the industry for rope terminations that reduce wear.

BRIEF DESCRIPTION OF THE DRAWINGS

So that the manner in which the above-recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 3B and 3C are front and side views, respectively, of a rope termination device according to another embodiment.

FIG. 10A is a schematic view of a tail buoy assembly according to one embodiment.

FIG. 10B is a schematic view of a front buoy assembly according to one embodiment.

FIG. 11A is a schematic view of a positioner for a marine survey assembly according to one embodiment.

FIG. 11B is an end view of the positioning member of FIG. 11A.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

It is to be understood the present disclosure is not limited to particular devices or methods, which may, of course, vary. It is also to be understood that the terminology used herein is for the purpose of describing particular embodiments only, and is not intended to be limiting. As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected. The term "rope" as used in this disclosure should be understood to include (by way of example and not limitation) cables, belts, cords, lines, strings, twines, wires, strands, hawsers, and other similar objects.

Some embodiments of this disclosure may allow for the superior load transfer capabilities of a sheave to a bolted connection assembly (as compared to, for example, a thimble to shackle assembly) and further may limit the problems previously experienced when a rope termination is free to rotate about only one axis.

Figure 1A:
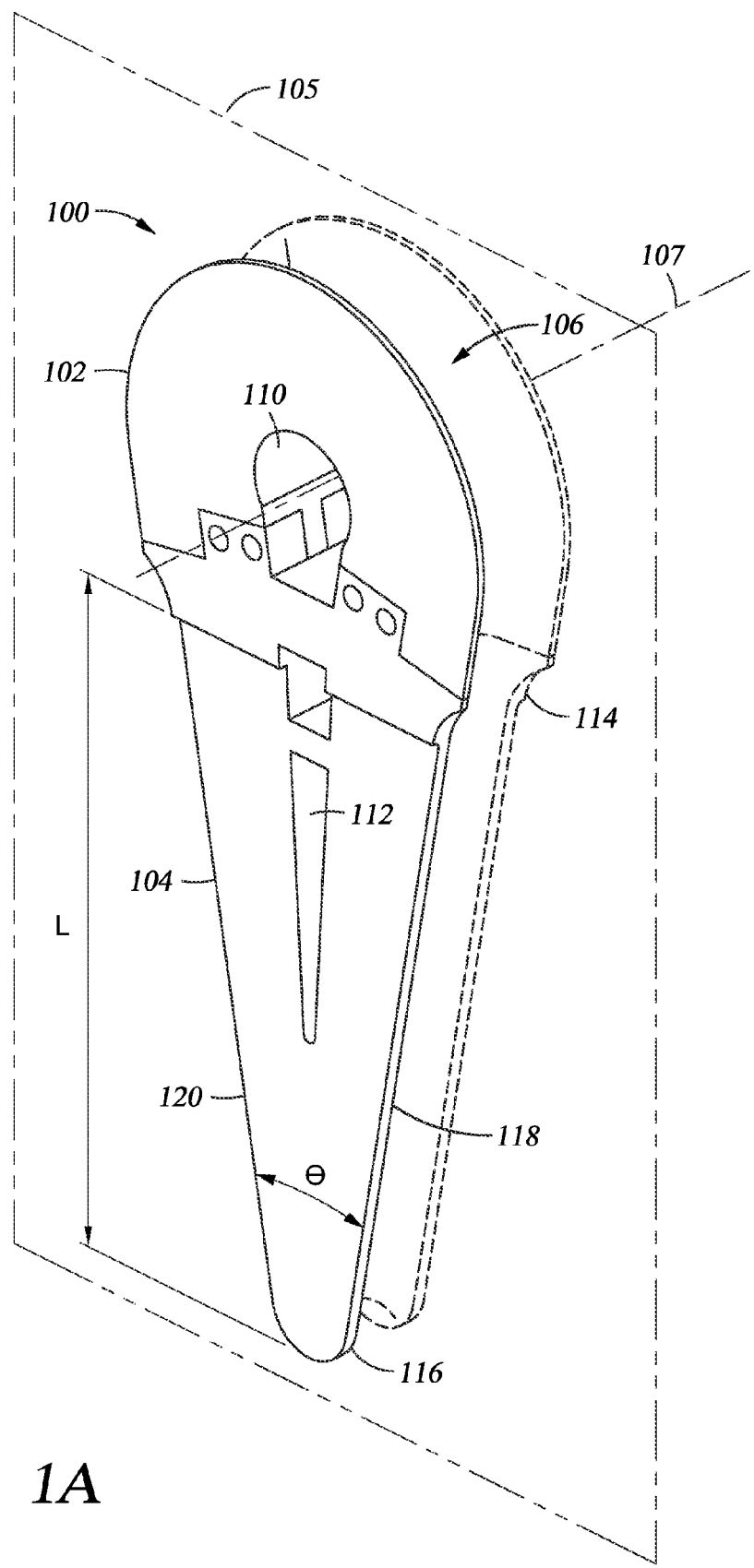
FIG. 1A is a perspective view of a rope termination device according to one embodiment.

FIG. 1A is a perspective view of a rope termination device 100 according to one embodiment. The rope termination device 100 generally has two parts, a connector 102 and a tail 104. The connector 102 is the main load-bearing part of the rope termination device 100, and may be a sheave or other load-bearing rope guide device, such as a thimble. The connector 102 has a passage 106 to receive a rope and guide the rope along a trajectory. In some embodiments, the trajectory of passage 106, which may be a groove, defines a plane 105 hereinafter referred to as the "centerplane" of rope termination device 100. Connector 102 may have an axial centerline 107 defined by, or in relation to, an axis of curvature of passage 106. The centerplane 105 may be perpendicular to the centerline 107.

Figure 1B:
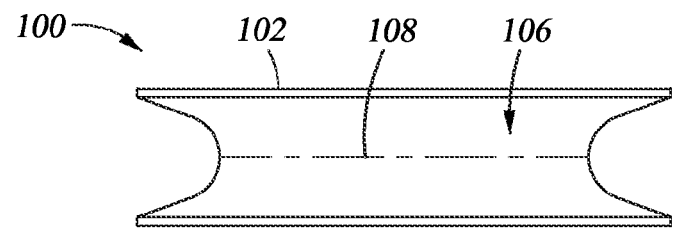
FIG. 1B is a top view of the rope termination device of FIG. 1A.

FIG. 1B is a top view of the rope termination device 100 of FIG. 1A. A minimum length curve 108 identified along an inner surface of the passage 106 generally follows the intersection of passage 106 and centerplane 105. In some embodiments, the minimum length curve 108 may be located along a bottom of the passage 106, which is the location of the passage 106 closest to the centerline 107 at each angular displacement around the centerline 107. The minimum length curve 108 may have a radius of curvature that is at least 3 times the outer radius of a rope to be used with the rope termination device 100, such as between about 4 times and about 8 times the outer radius, for example about 5 times the outer radius. For example, sizing and shaping the connector 102 such that the minimum length curve 108 has a radius of curvature that is at least 3 times the outer radius of the rope ensures stresses on the rope remain within generally acceptable levels.

The connector 102 may be metal, plastic, ceramic, reinforced fabric, or other material with a high tensile strength. Connector 102 may have an opening 110 for a connection, such as a bolt or shackle, to pass through. Opening 110 may be disposed along the centerline 107. In such an embodiment, the connector 102 is typically free to rotate in the centerplane 105, and may also be free to move along the centerline 107. For example, if a bolt is disposed through the opening 110, the connector 102 may be free to move along the length of the bolt and to rotate about the bolt. The opening 110 may be cooperatively enclosed between the connector 102 and the tail 104, and may have an area at the centerplane 105 that is larger than a cross-sectional area of the passage 106. In an alternate embodiment, the opening 110 may be through the connector 102, and may be surrounded on all sides by portions of the connector 102.

The tail 104 has a first end 114 that couples to the connector 102, and a second end 116 opposite the first end 114. The first end 114 has a first dimension that is generally compatible with a dimension of the connector 102 to provide smooth passage of a rope around the tail 104 and the connector 102. The second end 116 has a second dimension that is smaller than the first dimension to provide smooth coupling of the rope to the rope termination device 100. The second end 116 may be rounded or sharp to any desired degree.

The tail 104 has a first side 118 and a second side 120, which together define an angle θ. The angle θ is the angle between two portions of a rope wrapped around the rope termination device 100 as the portions engage the two sides 118 and 120. An axial load on the rope is distributed between the two portions of the rope by operation of the rope termination device 100. The axial load is resolved into a tensile stress and a shear stress in each portion of the rope, the tensile and shear stresses being related to the axial load by the angle θ. The tensile stress in each rope portion is magnified by the angle θ, and grows larger as the angle θ grows larger. Minimizing the angle θ thus minimizes the overtension in the portions of the rope wrapping around the connector 102.

The tail 104 has a length "L" that is related to the angle θ and the radius of curvature of the minimum length curve 108. As the angle θ diminishes, the length "L" can be increased to maintain a given radius of curvature of the minimum length curve 108. The length "L" may also be related to the flexure of the tail 104. A tail 104 with a larger length "L" may have a higher flexure strength to provide a larger curvature radius for a given load and fleet angle.

The tail 104 is a flexible member made of a material appropriately suited to the forces being applied so that the tail can distribute any forces resulting from a fleet angle over the length of the tail 104. The tail 104 may be made from a plastic material, such as a material selected from the group consisting of a polyolefin and a polyurethane. The tail may flex in response to a rope tension in direction angled (i.e. at a fleet angle) with respect to the centerplane 105. The tail 104, which may be a sheave tail if the connector 102 is a sheave, may distribute the misalignment, or substantially eliminate the fleet angle, over the length of the tail 104 until the tail 104 filially straightens the rope before entering the connector 102, such that at the entry point of the rope into the connector 102 there is essentially no fleet angle. The tail 104 may have a flexure that varies monotonically along a length of the tail 104. The flexure may have a strength that is at a maximum value near the first end 114 and a minimum value near the second end 116.

The tail 104 may be made from a flexible material that can be strength-adjusted to the expected fleet angle or vector force such that strumming or vibration in the rope may be transferred from the rope to the tail 104, which may vibrate together with the rope, and then from the tail 104 to the connector 102. Materials such as plastic, for example polyolefins, such as polypropylene, and polyurethane may be used to form the tail 104, and dimensions of the tail 104 may be adjusted to provide a selected strength or flexibility, passage size, and the like. The tail 104 may be molded, sculpted, or physically rendered for example by 3D printing. The tail 104 may have one or more optional openings 112 that may be adjusted to provide a selected strength, bulk density, or other property.

Figure 2:
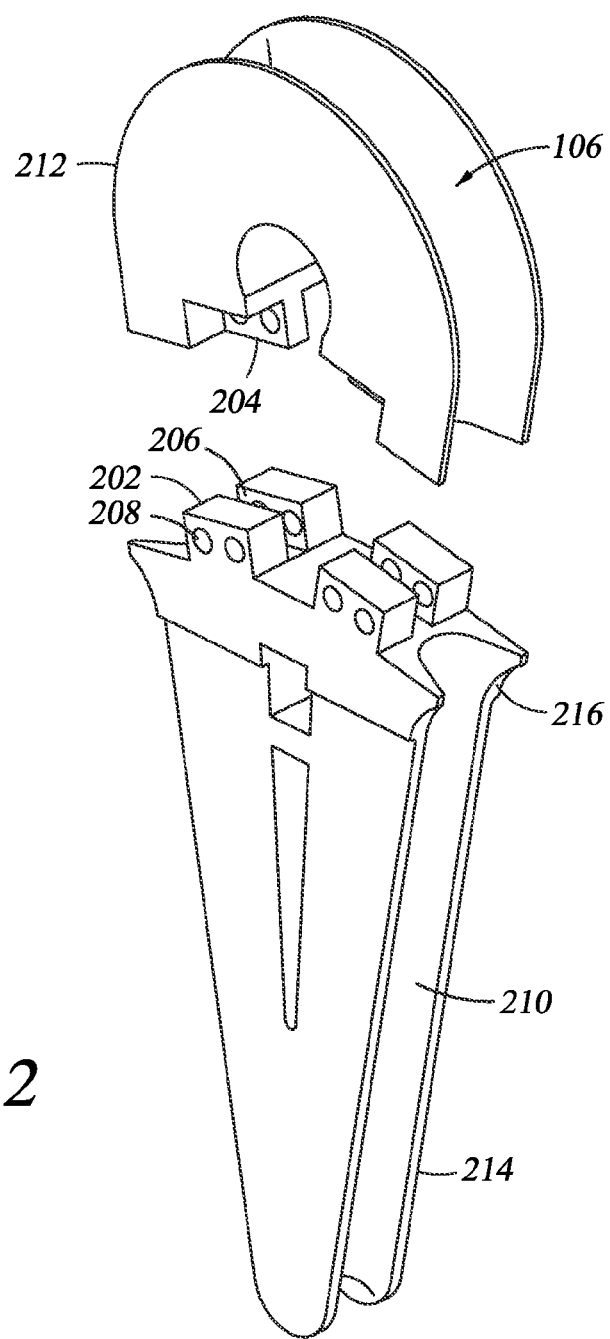
FIG. 2 is an exploded perspective view of the rope termination device of FIG. 1A.

FIG. 2 is an exploded perspective view of the rope termination device 100 of FIG. 1A showing the connector 102 and tail 104 separated. The tail 104 may have one or more attachment feature(s) 202 in registration with compatible attachment feature(s) 204 on the connector 102. In the embodiment of FIG. 2, the attachment feature 202 is a shoulder with a slot 206, and the attachment feature 204 is a tab that engages with the slot 206. The attachment features 202 and 204 each have one or more holes 208 for inserting a fastener (not shown). The connector 102 and tail 104 may thus be coupled using a plurality of pins disposed through the holes 208. In the embodiment of FIG. 2, the slot 206 is oriented parallel to the centerplane 105 (FIG. 1A) of the rope termination device 100.

The tail 104 has a passage 210 that corresponds to the passage 106 of the connector 102. The passage 210 registers with the passage 106 to allow uninterrupted access for a rope from the passage 210 into the passage 106 around the connector 102 and back into the passage 210 on the opposite side. In the embodiments of FIGS. 1 and 2, each of the passages 106 and 210 are grooves bounded by walls. The passage 106 has walls 212 that have a first height, and the passage 210 has walls 214 that have a second height, which may be the same as, or different from, the first height. In the embodiment of FIGS. 1 and 2, the second height is less than the first height. The tail 104 may feature a wall transition 216 that provides a curved wall portion with a height that transitions from the first height to the second height. In the embodiment of FIG. 2, the wall transition 216 features a curved wall portion of declining altitude.

Figure 3A:
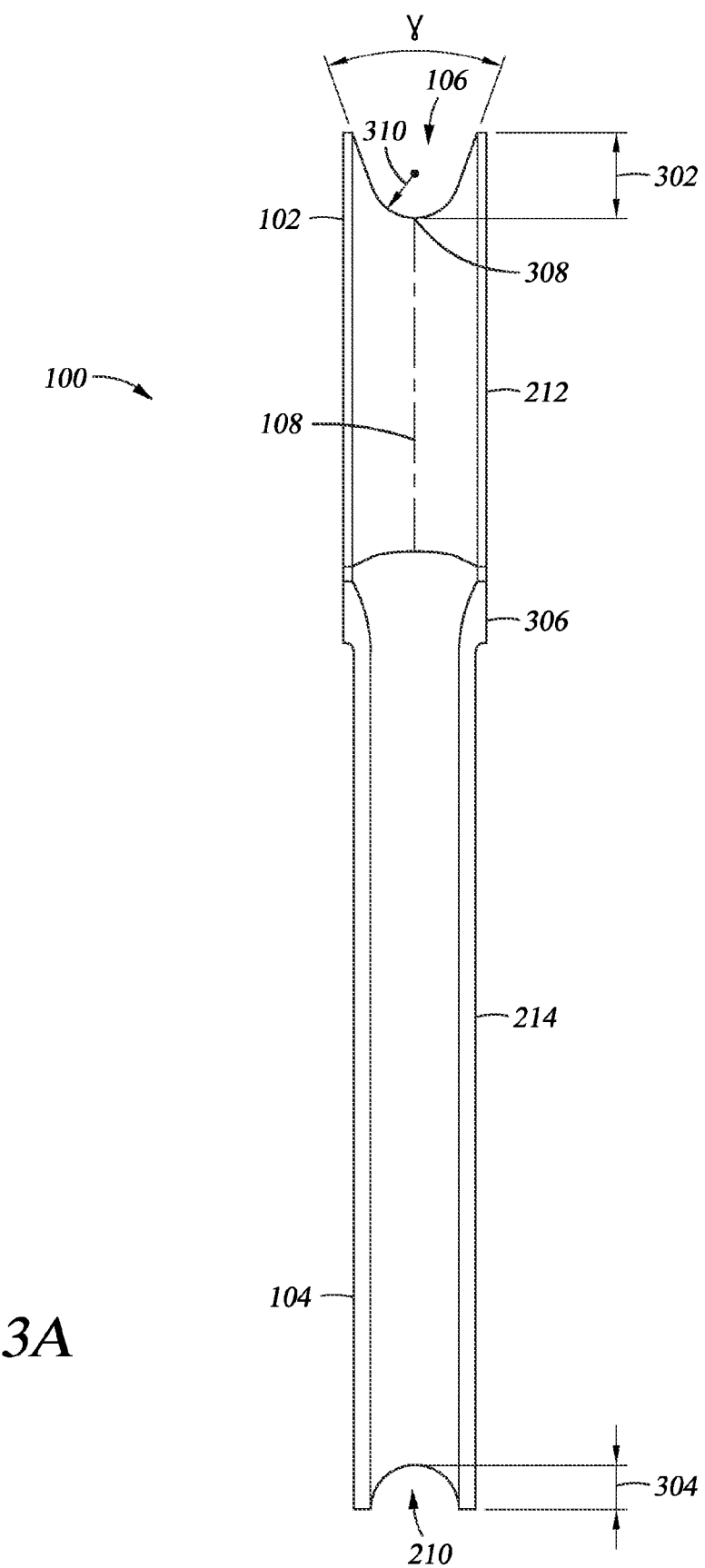
FIG. 3A is a side view of the rope termination device of FIG. 1A.

FIG. 3A is a side view of the rope termination device 100 of FIG. 1A. The connector 102 and tail 104 are shown looking into the respective passages 106 and 210. The walls 212 and the walls 214 have different thicknesses emerging from, inter alia, the mechanical properties of the two materials and the strength needs of the device. The first height is shown at 302, and the second height is shown at 304. The first height 302 may be larger than the second height 304 to ensure a rope remains seated in the passage 106. The second height 304 may be smaller because the rope seated in the passage 210 may be securely held in place by an overbraid jacket, as will be described further below.

The walls 212 of the connector 102 form an angle γ at an upper portion of the walls 212. The angle γ is selected to reduce wear on a rope disposed in the passage 106 by reducing sharpness of the upper portion of the walls 212. The angle γ may be between about 10° and about 90°, such as between about 30° and about 60°, for example about 45°. The passage 106 has a bottom region 308 that is curved to accommodate the shape of a rope. The bottom region 308 typically has a radius of curvature 310 selected to distribute stresses on the rope evenly over the cross-sectional area of the rope. The radius of curvature 310 of the bottom region 308 may be between about 103% of the radius of the rope and about 110% of the radius of the rope, for example about 105% of the radius of the rope.

The tail 104 has a shoulder region 306 that provides support for the attachment feature 202 (FIG. 2) and smoothly merges the passage 106 with the passage 210. The passage 210 may have a smaller width than that of the passage 106, especially if the second height 304 is less than the first height 302. The material of the tail 104 provides capability for the tail 104 to flex left and right in the view of FIG. 3 to mitigate a fleet angle in the rope.

FIG. 3B is a front view of a rope termination device 320 according to another embodiment. The rope termination device 320 is similar to the rope termination device 300 of FIG. 3, except that the rope termination device 320 has a connector 322 that is non-planar. The non-planar connector 322 may be bent at a bend location 324. The connector 322 has an extension 326 to accommodate the bend location 324 without changing the geometry of the opening 110 or the connection between the connector 322 and the tail 104. The dimension of the extension 326 depends on the degree of the bend at the bend location 324. A sharper bend can be accommodated by a shorted extension 326, whereas a more gentle bend can be accommodated by a longer extension 326.

FIG. 3C is a side view of the rope termination device 320. The bend may be substantially circular with a radius of curvature 328 at least as large as a diameter of a rope to be disposed in the passage 106 (FIG. 3A), for example at least as large as the first height 302 (FIG. 3A). A bend angle 330 may be selected based on the needs of a particular use, and the bend angle 330 and the radius of curvature 328 will influence the size of the extension 326. Other embodiments of non-planar rope termination devices may also be used. A rope termination device may have more than one bend, for example a serpentine bend that forms an s-shape, or a bend with more than one radius of curvature. A rope termination device may also have a bend along an axis different from that shown in FIGS. 3B and 3C.

Figure 4:
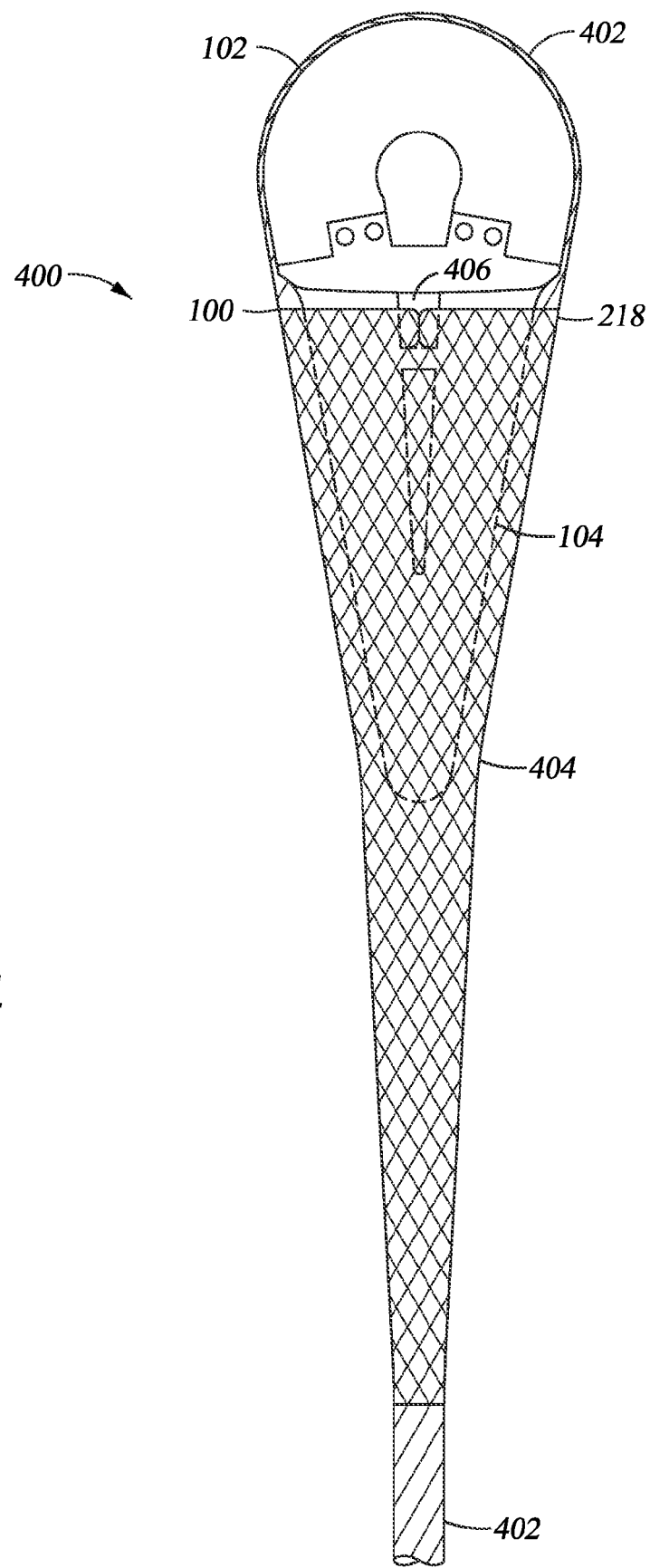
FIG. 4 is a front view of the rope termination device of FIG. 1A.

FIG. 4 is a front view of a rope termination 400 according to one embodiment. The rope termination 400 includes the rope termination device 100 and a rope 402 installed with an overbraid jacket 404. The overbraid jacket 404 may be constructed by unraveling a few surface strands of the rope 402 to expose the rope core, laying the rope core in the passage 210 of the tail 104 (shown in phantom under the overbraid jacket 404) and the passage 106 of the connector 102, and braiding the surface strands over and around the rope termination device 100. The surface strands may be routed through an opening 406 provided proximate the first end 114 of the tail 104 to secure the overbraid jacket 404 to the rope termination device 100. Alternately, the overbraid jacket 404 may be formed from a separate piece of rope material or other jacketing material. The overbraid jacket 404 may help to secure the rope 402 to the tail 104, preventing the rope 402 from migrating out of the passage 210 (FIG. 2) as the tail 104 flexes.

Figure 5A:
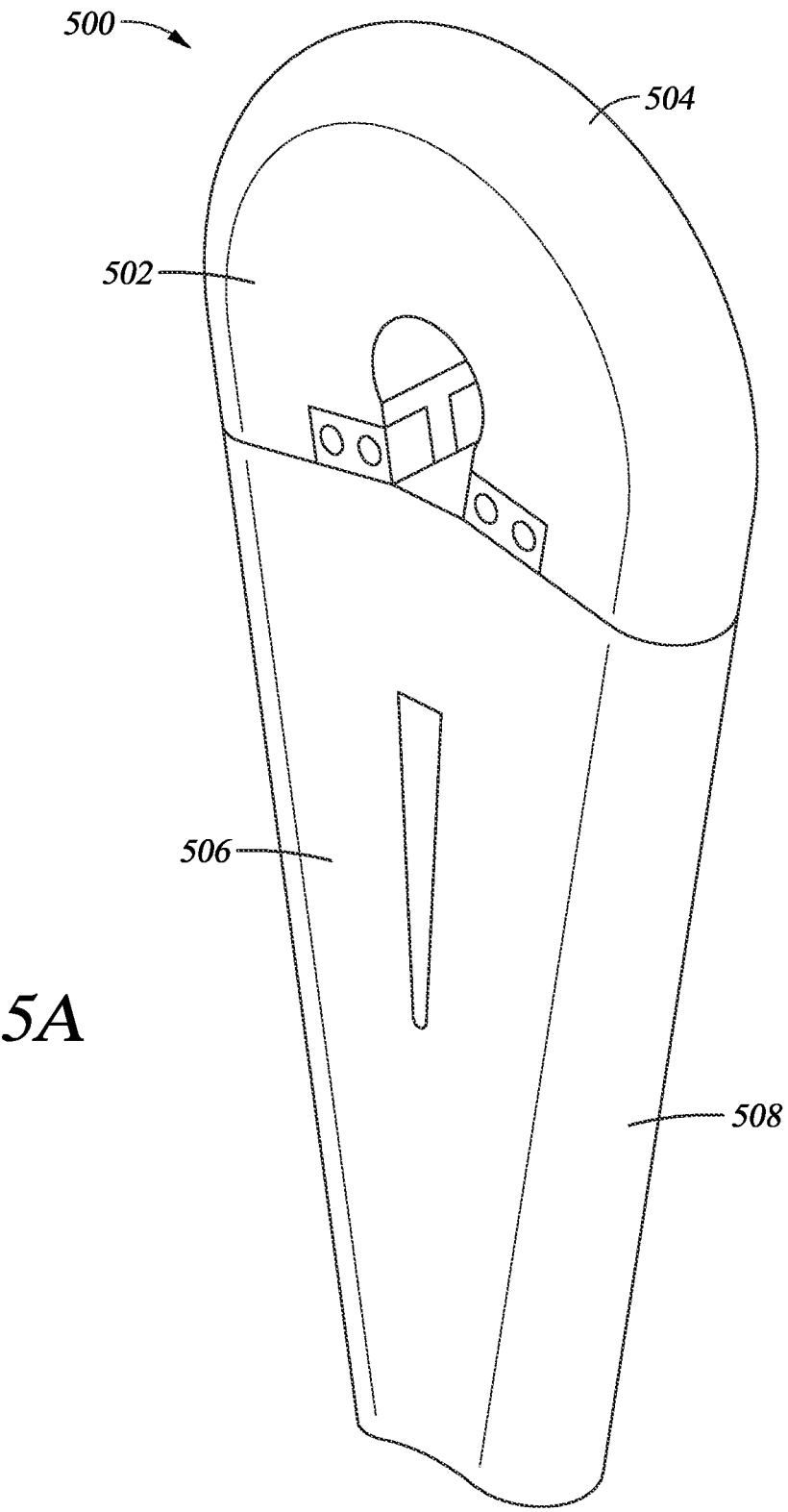
FIGS. 5A-5C are perspective views of different alternative embodiments of rope termination devices.
Figure 5B:
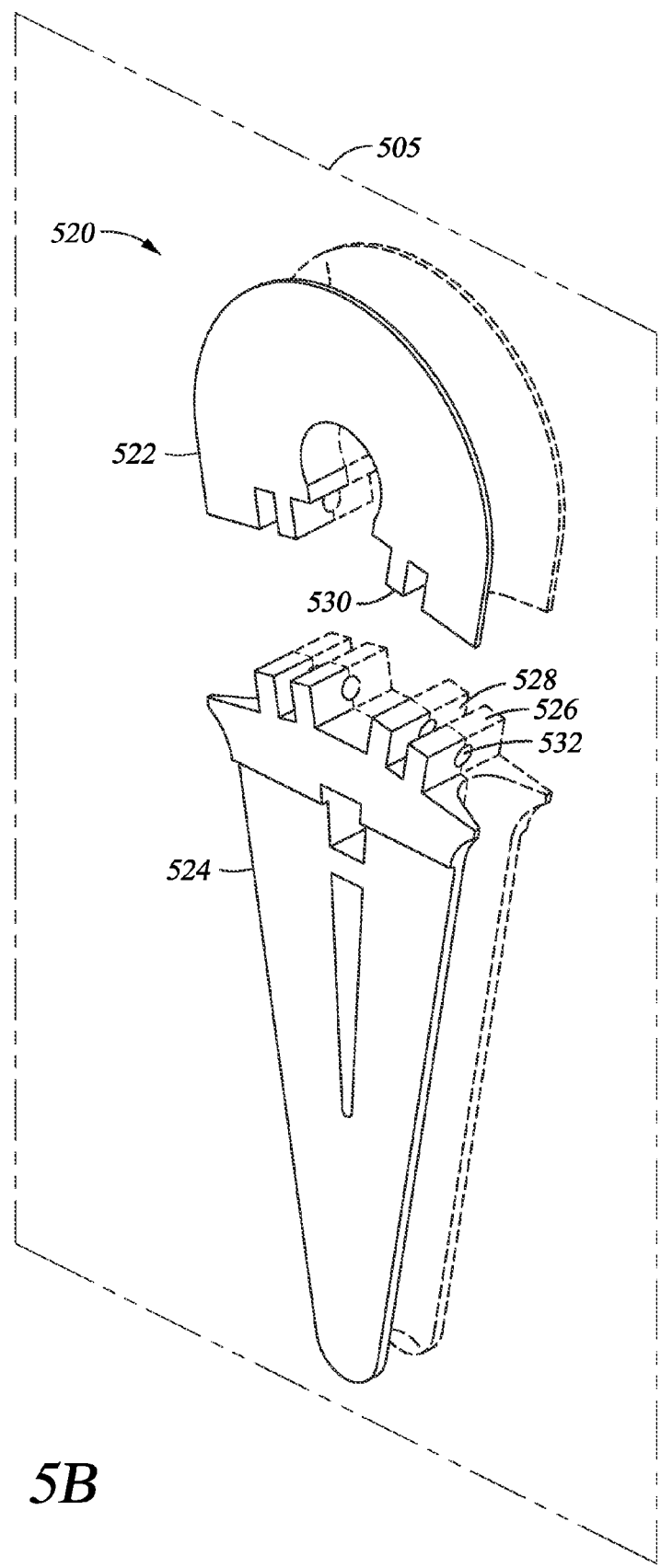
Figure 5C:
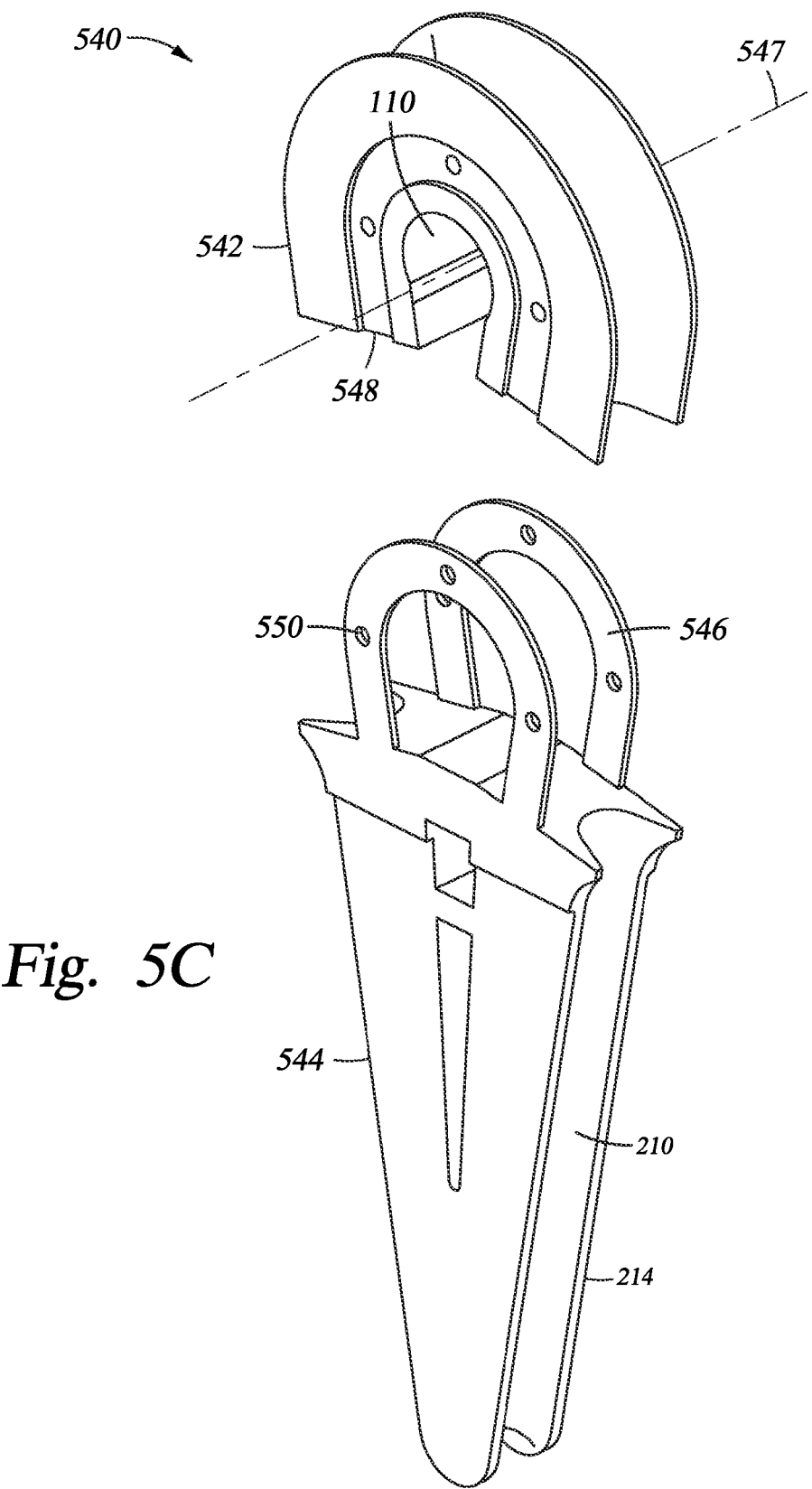

FIGS. 5A-5C are perspective views of alternative embodiments of rope termination devices. FIG. 5A shows a rope termination device 500 where one or both of the passages 106 and 210 are enclosed to form conduits for the rope to pass through. The rope termination device 500 includes a connector 502 with a conduit 504 for passing a rope through, and a tail 506 with a conduit 508 for passing the same rope through. Conduit 508 of tail 506 may be an alternate way to secure the rope to the tail 506 without using an overbraid jacket. The conduit 508 may have a wall thickness in a side portion and upper portion of the conduit 508 to provide mechanical strength that will resist mechanical failure under the lateral loads accompanying use of the rope termination device 500 under fleet angle conditions. The rope termination device 500 may have the fastening features described above in connection with FIG. 2, and may also have any of the alternative fastening features described below in connection with FIGS. 5B and 5C. The tail 506 shown in FIG. 5A may have a length "L" that is longer than the length "L" of the tail 104 of FIG. 1A. As noted above, the length of the tail may be selected to provide a desired flexing behavior under load.

FIG. 5B is a perspective view of a rope termination device 520 according to another embodiment. The rope termination device 520 is similar in most respects to the rope termination device 100 of FIG. 1A, except the rope termination device 520 has a connector 522 and tail 524 that have a different attachment configuration. The attachment features of the rope termination device 520 are similar to the attachment features 202 and 204 shown in FIG. 2, except that the tail 524 has an attachment feature 526 with a slot 528 oriented perpendicular to a centerplane 505 of the rope termination device 520. The connector 522 has a matching attachment feature 530 that includes a tab that engages the slot 528, and the attachment feature 530 and attachment feature 526 may be fastened through the holes 532, for example by one or more pins.

FIG. 5C is a perspective view of a rope termination device 540 according to another embodiment. The connector 542 and tail 544 of the rope termination device 540 may be connected by a pair of loops 546 that engage with a pair of recesses 548 formed around a centerline 547 of the connector 542. The recesses 548 are formed in the side of the connector 542 and surround the central opening 110 of the connector 542. The loops 546 may be fastened into the recesses 548 by applying fasteners through the holes 550.

Figure 6:
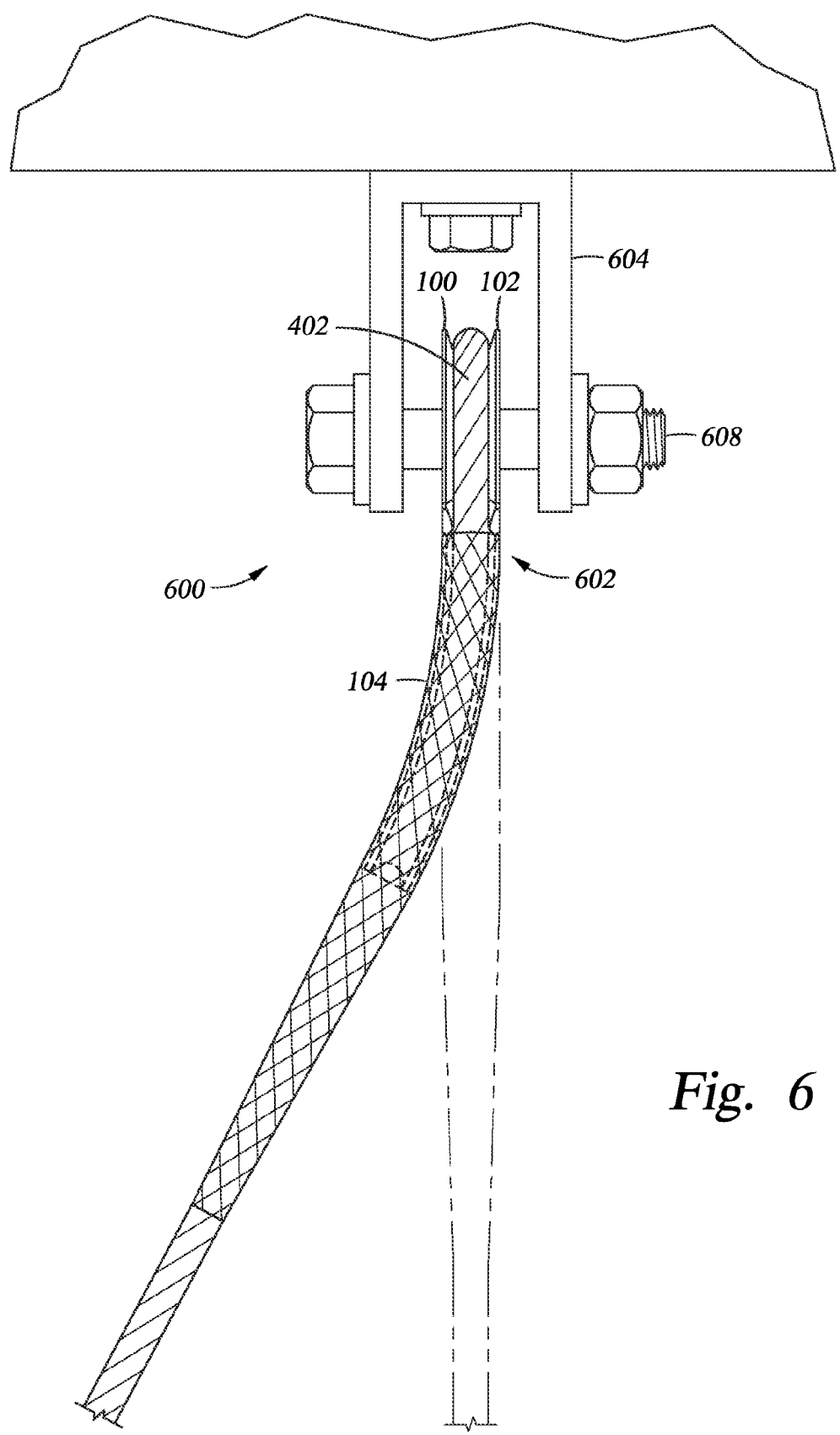
FIG. 6 is a side view of a rope termination assembly according to another embodiment.

FIG. 6 is a side view of a rope termination assembly 600 according to one embodiment. The rope termination assembly 600 includes a rope termination 602 connected to a bolt connection 604. The bolt connection 604 is shown in a fastened orientation, which may be fastened to any convenient object, such as a tow vessel for marine surveying. For example the bolt connection 604 may be used with a tow vessel to connect an energy source or sensor cable to the tow vessel. The rope termination 602 features the rope termination device 100, with the rope 402 disposed in the rope termination device 100 and secured with the overbraid jacket 404. The bolt connection 604 has a bolt 608, which is disposed through the opening (not visible in the side view of FIG. 6) of the connector 102. The bolt 608 is sized, relative to the opening, to allow free movement of the rope termination 602 along the bolt 608 and free rotation of the rope termination 602 around the bolt 608. The rope 402 is shown in a loaded configuration with the direction of the load causing a lateral displacement of the rope 402 relative to the connector 102. The tail 104 displays a curvature resulting from the load, and the curvature of the tail 104 may help prevent the rope 606 from encountering any high friction stress points that would tend to degrade the rope. The tail 104 may also absorb much vibration from the rope that may tend to cause rubbing of the rope against the otherwise stationary connector 102, relieving the rope 402 of two major causes of rapid failure.

Figure 7:
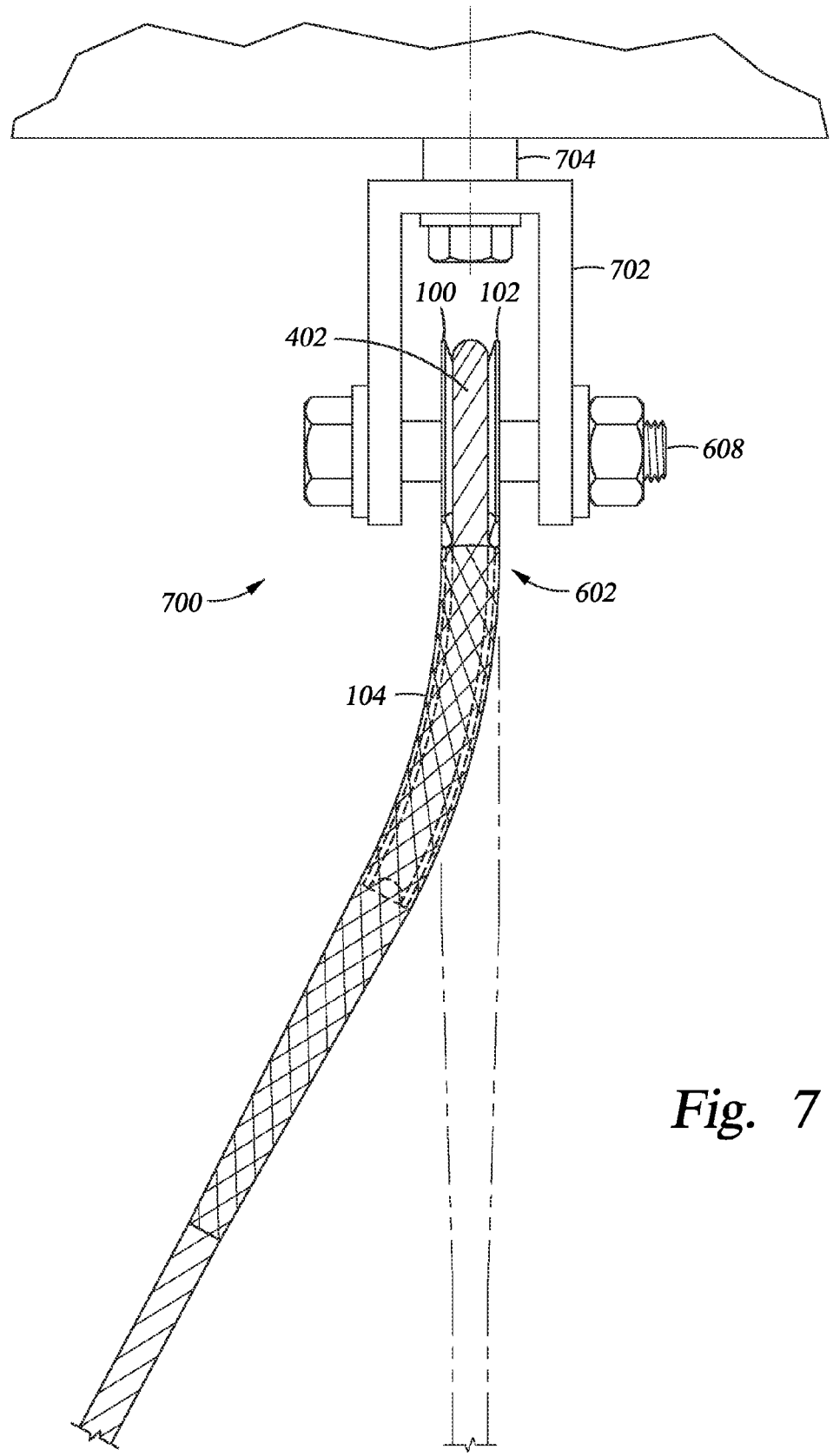
FIG. 7 is a side view of a rope termination assembly according to another embodiment.

FIG. 7 is a side view of a rope termination assembly 700 according to another embodiment. The rope termination assembly 700 is similar to the rope termination assembly 600 of FIG. 6, including the rope termination device 100, but with the bolt 608 as part of a shackle connection 702. The shackle connection 702 has a swivel point 704 that enables rotation about the axis of the swivel point 704, while the bolt 608 and rope termination device 100 enable rotation about the bolt 608 and movement along the bolt 608.

Figure 8A:
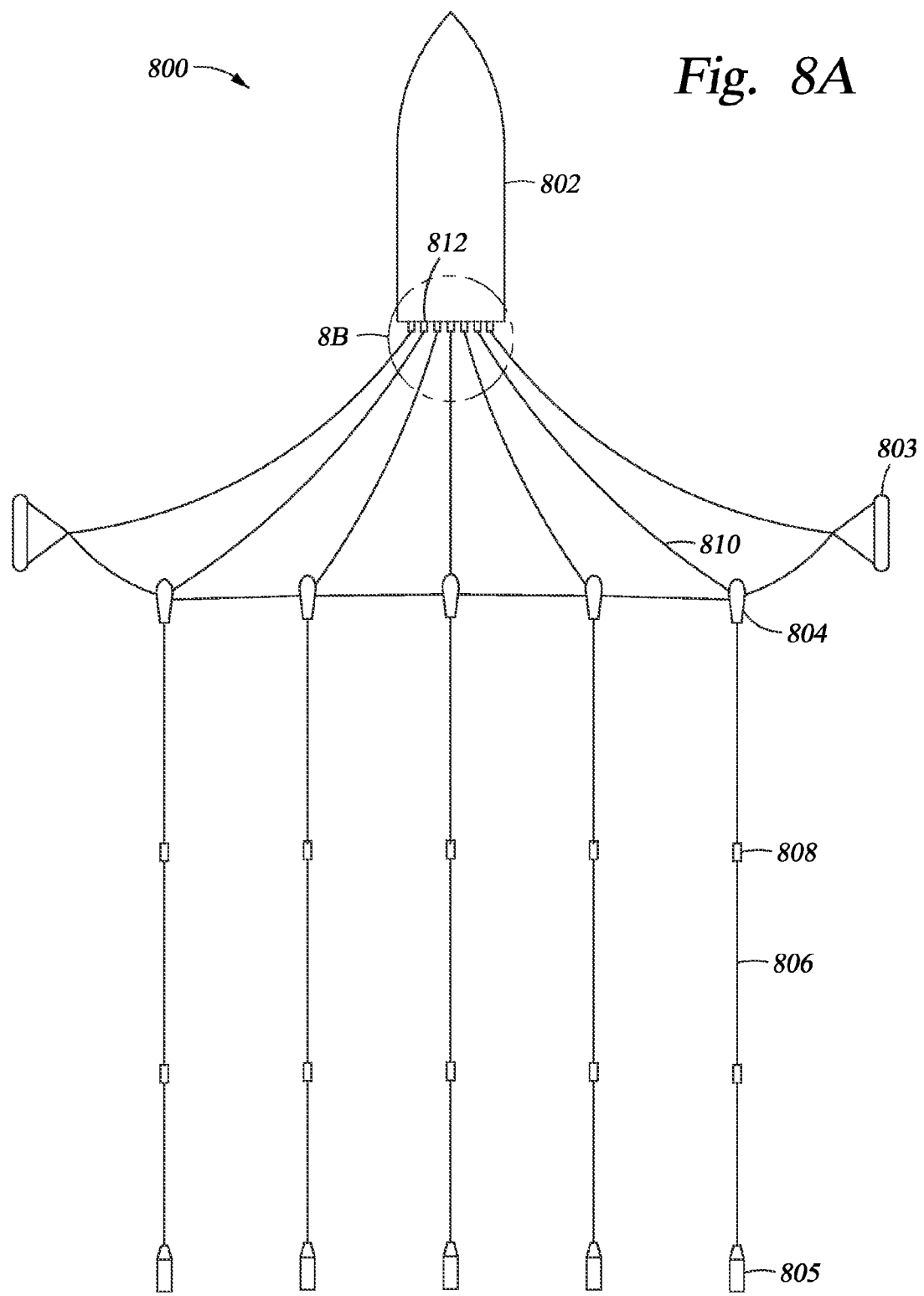
FIG. 8A is a schematic representation of a marine surveying system according to one embodiment.

The rope termination devices and assemblies described herein may be used to secure equipment such as energy sources and sensor cables in a marine surveying system. FIG. 8A is a schematic representation of a marine surveying system 800 according to one embodiment. A vessel 802 tows a cable assembly. In the illustrated embodiment, the marine surveying system 800 includes one or more front floats 804 and one or more positioners 803, though these may not be included in all embodiments. As illustrated, a plurality of cables 806 is attached to the front floats 804, each cable 806 having one or more devices 808 attached to or incorporated in the cable 806. Other embodiments might include only a single cable 806. The devices 808 may be any of an energy source, a sensor cable, a locator, or a positioner, all marine surveying devices known in the art. Each of the cables 806 has an optional tail buoy 805 attached at a trailing end of the cable.

Figure 8B:
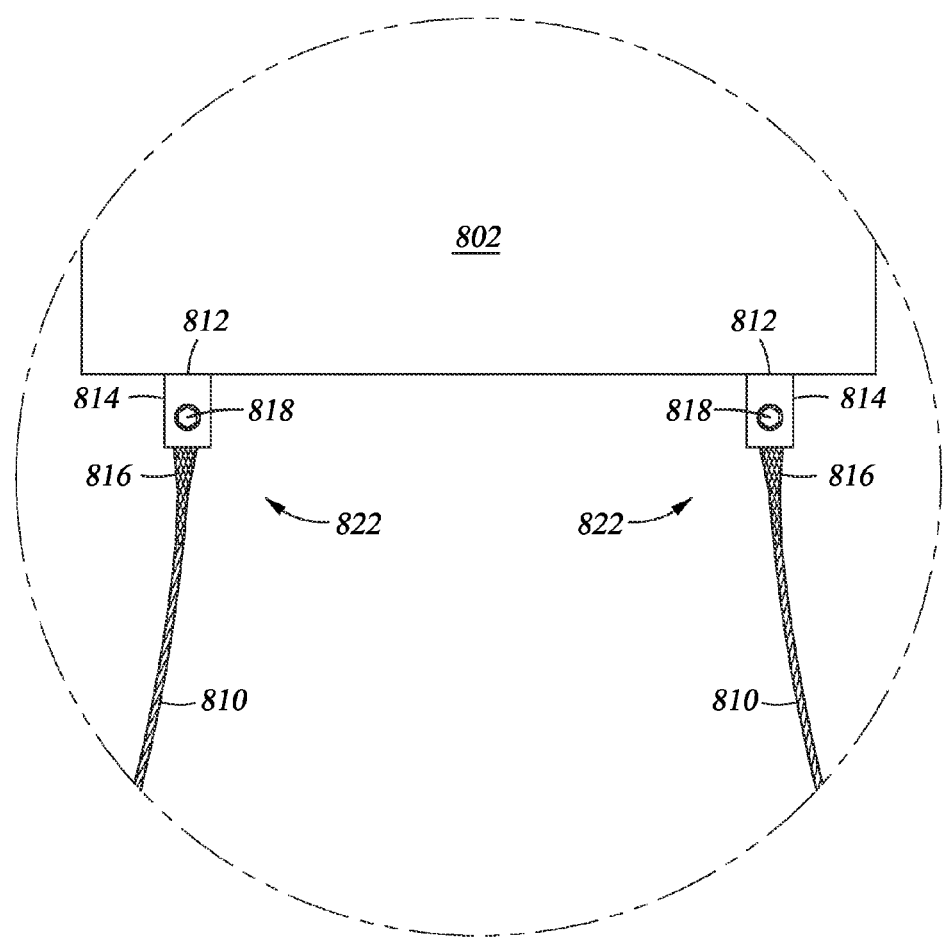
FIG. 8B is a close-up view of a portion of the marine surveying system of FIG. 8A.

In the illustrated embodiment, each of the front floats 804 and positioners 803 is attached to the vessel 802 by a tow line 810, each of which is attached to the vessel 802 at an attachment point 812. FIG. 8B is a close-up view of the tow lines 810 attached at the attachment point 812 according to one embodiment. The attachment point 812 may feature a rope termination assembly 822 similar to the rope termination assemblies 600 and 700. In the embodiment of FIG. 8B, a bracket 814 is attached to the vessel 802, and a bolt connection 818 is secured in the bracket 814. The tow line 810 is secured to the bolt connection 818 by a rope termination device 816 having the features of the rope termination device 100, or any other embodiment of a rope termination device described herein. As shown in FIG. 8B, the rope termination assembly 822 is oriented such that the rope termination device 816 may rotate about the bolt connection 818 in a laterally-extending plane, and may move freely along the bolt connection 818 in a direction perpendicular to the laterally-extending plane. Having the features of a rope termination device as described herein, the rope termination assembly 822 will support a fleet angle in the tow line 810 with an angular displacement parallel to the bolt connection 818 without undue wear on the tow line 810.

Alternately, each of the tow ones 810 may have a cable 806 directly attached in some embodiments. Also, the rope termination assembly 822 may be rotated 90°, if desired, to provide flexure of the assembly 822 in the lateral direction.

In general, undue wear on ropes with ring-like or eye-like connectors may be reduced by providing a structure that may help to absorb stress due to fleet angle in operation of such a rope. The rope may be wrapped around a rope termination device that has a metal connector, which may be eye-like or ring-like, that may be fastened to a tail designed to flex in a direction perpendicular to a plane through an axial centerline of the rope termination device. The tail may have a flexure that may help to absorb stress from the fleet angle of the rope termination assembly so that the rope does not experience undue wear from friction points between the rope and the metal connector or the rope termination assembly. The tail flexes such that an angle between the rope and the plane through the axial centerline of the rope termination device, at the point the rope initially contacts the metal connector, is reduced. Likewise, an angle between the rope and the tail at the point the rope initially contacts the tail is reduced. The rope generally lies in a groove or passage formed around an exterior of the tail and the connector, providing a pathway for the rope to wrap around the rope termination assembly. The rope may be secured to the rope termination assembly using an overbraid jacket that may be made from unravelled surface strands of the rope, or from a different piece of jacketing material.

Figure 9:
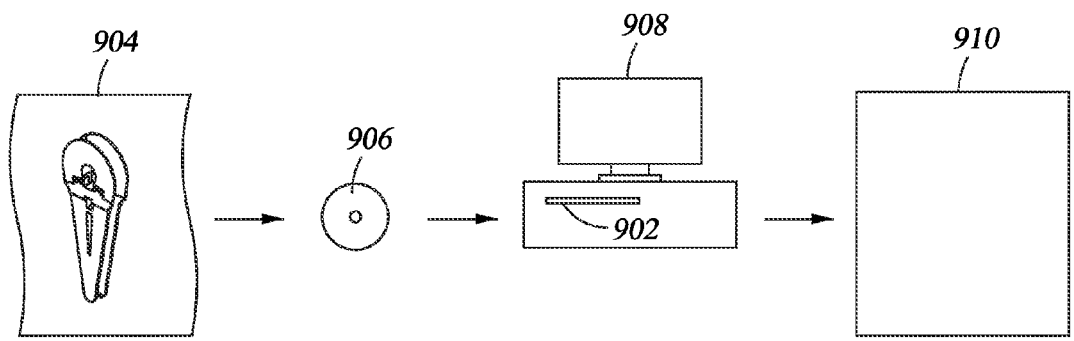
FIG. 9 is a schematic representation of a manufacturing system according to one embodiment that may be used to make one component of a rope termination assembly.

The tails 104, 506, 524, and 544, or any embodiment of a tail for a rope termination device as described herein, may be made of a material amenable to physical rendering by a computer controlled rendering device. The design for the tail may be stored on a computer-readable medium that may be used, along with an appropriately programmed computer operatively communicant with a physical rendering device, to produce a physical specimen of a tail. FIG. 9 is a schematic representation of a manufacturing system 900 according to one embodiment that may be used to make components of a rope termination assembly as described herein. The manufacturing system 900 features a computer system 920 with a computes-readable medium 902 according to one embodiment. The computer-readable medium 902 may contain a data structure 904 that represents an embodiment of the tail 104 (and 506, 524, 544). The data structure 904 may be a computer file, and may contain information about the structures, materials, textures, physical properties, or other characteristics of a tail embodiment. The data structure 904 may also contain instructions for making a tail embodiment, such as design information and/or code, such as computer executable code or device control code, that engages selected functionality of a computer rendering device or a computer display device. The data structure 904 may be stored on a physical storage medium 906, such as a magnetic memory, floppy disk, or any convenient physical storage medium. The physical storage medium 906 may be readable by the computer system 900 to render the article represented by the data structure 904 on a computer screen 908 or a physical rendering device 910, which may be an additive manufacturing device, such as a 3D printer.

FIGS. 10A, 10B, 11A, and 11B are schematic views of different configurations using rope termination assemblies described herein. FIG. 10A is a schematic view of a tail buoy assembly 1000 according to one embodiment. The tail buoy assembly 1000 may include a geophysical sensor assembly 1002, such as a sensor cable, coupled to a tail buoy 1004 using a rope termination assembly 1006 that features the rope termination device 100, such as the rope termination assembly 600 or the rope termination assembly 700. The tail buoy 1004 may be the tail buoy 805 of FIG. 8A, and the geophysical sensor assembly 1002 may be the cable 806 of FIG. 8A.

FIG. 10B is a schematic view of a front buoy assembly 1010 according to one embodiment. The front buoy assembly 1010 may include the geophysical sensor assembly 1002 coupled to a front buoy 1012 using a rope termination assembly 1014 that features the rope termination device 100, such as the rope termination assembly 600 or the rope termination assembly 700. The front buoy 1012 may be the float 804 of FIG. 8A, and the geophysical sensor assembly 1002 may be the cable 806 of FIG. 8A.

FIG. 11A is a schematic view of a positioner 1100 for a marine survey assembly according to one embodiment. The positioner 1100 may be the positioner 803 of FIG. 8A. The positioner 1100 may have a float 1110 and a plurality of force members 1102 extending from the float 1110. One or more strength members 1104 may couple the force member 1102 together to maintain the force members 1102 in a fixed position relative to the float 1110. The positioner 1100 may be attached to a vessel and/or another component of the marine survey assembly using rope termination assemblies and devices as described herein, for example the rope termination assemblies 600 or 700 and/or the rope termination devices 100 or 500.

FIG. 11B is an end view of the positioning member 1100 showing the attachment assembly 1106 incorporating the rope termination assembly 600 to attach the rope 402 to the positioner 1100. As shown in FIG. 6, the attachment assembly 1106 may provide a lateral degree of freedom through bending of the tail portion without putting unwanted stress on the rope 402. The positioning member 1100 may adopt an angled posture during operation, which may result in a fleet angle. The attachment assembly 1106 prevents excessive wear on the rope 402 resulting from the fleet angle by absorbing the fleet angle in the bend of the rope termination device incorporated in the attachment assembly 1106.

While the foregoing is directed to embodiments of the present invention, other and further embodiments of the invention may be devised without departing from the basic scope thereof, and the scope thereof is determined by the claims that follow.

The invention claimed is:

1. A rope termination device, comprising:
    a connector with a passage for receiving a rope, the passage having a trajectory that defines a centerplane of the rope termination device; and
    a tail coupled to the connector, the tail having
        a flexure in a direction perpendicular to the centerplane; and
        a passage aligned with the passage of the connector, the passage of the tail comprising a first portion along the centerplane on a first side of the tail, and the second portion along the centerplane on an opposite side of the tail from the first portion.

2. The rope termination device of claim 1, wherein the connector and the tail cooperatively enclose an opening between the connector and the tail that has an area at the centerplane that is larger than a cross-section of the passage of the connector.

3. The rope termination device of claim 1, wherein the tail has a first end with a first dimension and a second end with a second dimension smaller than the first dimension, and the tail is coupled to the connector at the first end.

4. The rope termination device of claim 3, wherein the tail comprises an opening proximate the first end.

5. The rope termination device of claim 1, wherein the flexure of the tail has a strength that varies monotonically along the length of the tail from a maximum at the first end to a minimum at the second end.

6. The rope termination device of claim 3, wherein the tail is coupled to the connector by a fastener.

7. The rope termination device of claim 6, wherein the tail is coupled to the connector by a plurality of pins.

8. The rope termination device of claim 1, wherein the connector is metal and the tail is plastic.

9. The rope termination device of claim 8, wherein the tail comprises a material from the group consisting of polyolefin and polyurethane.

10. The rope termination device of claim 1, wherein the passage of the connector has a first depth, and the passage of the tail has a second depth less than the first depth.

11. A marine surveying system, comprising:
    a vessel having a tow attachment point; and
    a tow line coupled to the tow attachment point by a connector having a passage that receives the tow line in a curve that defines a plane, with a tail coupled to the connector, the tail having
    a flexure in a direction perpendicular to the plane; and
    a passage aligned with the passage of the connector, the passage of the tail comprising a first portion along the centerplane on a first side of the tail, and the second portion along the centerplane on an opposite side of the tail from the first portion.

12. The marine surveying system of claim 11, wherein the tail has a first end with a first dimension and a second end with a second dimension smaller than the first dimension.

13. The marine surveying system of claim 12, wherein the tow line is coupled to the tow attachment point at an opening cooperatively defined by the connector and the tail.

14. The marine surveying system of claim 13, wherein the tow line comprises a rope with an overbraid jacket covering at least part of the tail.

15. The marine surveying system of claim 14, wherein the tail has an opening proximate the first end thereof and the overbraid jacket is secured to the tail through the opening.

16. The marine surveying system of claim 15, wherein the tow line comprises an energy source, an energy sensor, a locator, or a positioner.

17. The marine surveying system of claim 15, wherein the tow line is attached to a cable termination assembly having a plurality of cables attached thereto, each cable attached to the cable termination assembly comprising an energy source, an energy sensor, a locator, or a positioner.

18. The marine surveying system of claim 11, wherein the connector is metal and the tail comprises plastic.

19. The marine surveying system of claim 18, wherein the tail comprises a polyolefin or a polyurethane.

20. The marine surveying system of claim 11, wherein the passage of the connector has a first depth, and the passage of the tail has a second depth less than the first depth.

21. A method of attaching a rope to a linear connection point, comprising:
    wrapping the rope around a rope termination device having a metal connector fastened to a flexible tail; and
    securing the rope to the rope termination device by applying an overbraid jacket to the portion of the rope that contacts the flexible tail.

22. The method of claim 21, further comprising forming the flexible tail from a polymer material and fastening the flexible tail to the metal connector using a plurality of pins.

23. A rope termination assembly, comprising:
    a bolt connection; and
    a rope termination assembly connected to the bolt connection, the rope termination assembly comprising:
        a rope termination device, comprising:
            a connector with a passage for receiving a rope, the passage having a trajectory that defines a centerplane of the rope termination device; and
            a tail coupled to the connector, the tail having a flexure in a direction perpendicular to the plane; and
        a rope disposed in the connector and the tail, wherein the rope is secured to the connector and the tail with an overbraid jacket.

24. The rope termination assembly of claim 23, wherein the tail has a first end with a first dimension and a second end with a second dimension smaller than the first dimension, the tail is coupled to the connector at the first end, and wherein the flexure of the tail has a strength that varies monotonically along the length of the tail from a maximum at the first end to a minimum at the second end.

* * * * *